US007706644B2

(12) United States Patent
Webster et al.

(10) Patent No.: US 7,706,644 B2
(45) Date of Patent: Apr. 27, 2010

(54) OFFSET LAUNCH MODE FROM NANOTAPER WAVEGUIDE INTO MULTIMODE FIBER

(75) Inventors: Mark Webster, Bethlehem, PA (US); Prakash Gothoskar, Allentown, PA (US); Vipulkumar Patel, Breinigsville, PA (US); David Piede, Allentown, PA (US)

(73) Assignee: Lightwire, Inc., Allentown, PA (US)

( * ) Notice: Subject to any disclaimer, the term of this patent is extended or adjusted under 35 U.S.C. 154(b) by 0 days.

(21) Appl. No.: 12/218,367

(22) Filed: Jul. 15, 2008

(65) Prior Publication Data

US 2009/0123114 A1 May 14, 2009

Related U.S. Application Data

(60) Provisional application No. 60/962,097, filed on Jul. 26, 2007, provisional application No. 61/127,806, filed on May 15, 2008.

(51) Int. Cl.
*G02B 6/26* (2006.01)

(52) U.S. Cl. ............................ 385/27; 385/15; 385/17; 385/50; 385/52; 385/83

(58) Field of Classification Search ............. 385/30–31, 385/27–28, 50, 14–16, 130–132, 83
See application file for complete search history.

(56) References Cited

U.S. PATENT DOCUMENTS 6,273,619 B1 8/2001 Shahid et al.
6,356,687 B1 3/2002 Shahid
6,402,390 B1 6/2002 Anderson et al.
6,434,302 B1 8/2002 Fidric et al.
6,501,884 B1 12/2002 Golowich et al.
6,580,543 B1 6/2003 Fan et al.
6,788,850 B2 9/2004 Albrecht et al.
6,839,481 B2 1/2005 White
7,013,067 B2 * 3/2006 Ghiron et al. ................. 385/39
7,215,846 B1 5/2007 Deliwala
7,215,847 B2 5/2007 Werner et al.
7,228,032 B2 * 6/2007 Blauvelt et al. ............... 385/31

(Continued)

OTHER PUBLICATIONS

Po Dong, Stefan F. Preble, Michal Lipson, "All Optical Compact Silicon Comb Switch", Jul. 23, 2007, vol. 15, No. 15, Optics Express.

*Primary Examiner*—Brian M. Healy
*Assistant Examiner*—Guy G Anderson
(74) *Attorney, Agent, or Firm*—Wendy W Koba

(57) ABSTRACT

One or more nanotaper coupling waveguides formed within an optical substrate allows for straightforward, reproducible offset launch conditions to be achieved between an incoming signal and the core region of a multimode fiber (which may be disposed along an alignment fixture formed in the optical substrate), fiber array or other multimode waveguiding structure. Offset launching of a single mode signal into a multimode fiber couples the signal into favorable spatial modes which reduce the presence of differential mode dispersion along the fiber. This approach to providing single mode signal coupling into legacy multimode fiber is considered to be an improvement over the prior art which required the use of an interface element between a single mode fiber and multimode fiber, limiting the number of propagating signals and applications for the legacy multimode fiber. An optical switch may be used to select the specific nanotaper(s) for coupling into the multimode fiber.

18 Claims, 10 Drawing Sheets

U.S. PATENT DOCUMENTS 7,242,870 B2 7/2007 Guan et al.
7,352,937 B2 4/2008 Zhong et al.
7,359,595 B2 4/2008 Meadowcroft
7,373,052 B2 5/2008 Nadeau et al.
2005/0180678 A1 8/2005 Panepucci et al.
2006/0023997 A1 2/2006 Almeida et al.
2006/0215949 A1 * 9/2006 Lipson et al. .................. 385/2
2007/0081764 A1 4/2007 Deliwala
2007/0274630 A1 11/2007 Ghiron et al.
2008/0105940 A1 5/2008 Piede et al.

* cited by examiner

LIGHT SOURCE
$\lambda_1$
20
I
MODULATOR
22
D
O
PROGRAMMABLE/ TUNABLE SWITCH MATRIX 1x4
30
C
CONTROL SIGNAL
10-1
10-2
10-3
10-4
26-1
26-2
26-3
26-4
24
12
14
16
18

LIGHT SOURCE
$\lambda_A$
$\lambda_B$
$\lambda_C$
$\lambda_D$
20-A
20-B
20-C
20-D
MODULATOR
MODULATOR
MODULATOR
MODULATOR
22-A
22-B
22-C
22-D
$D_A$
$D_B$
$D_C$
$D_D$
$O_A$
$O_B$
$O_C$
$O_D$
10-A
10-B
10-C
10-D
26

MULTIMODE FIBER CORE
14
18

PROGRAMMABLE/TUNABLE
COUPLING OR
SWITCHING FUNCTION
NxN
C
60
O
O_N
O_1
10
10-N
10-1
24
12
16
14
18

72
LIGHT SOURCE/
SWITCH MATRIX
[10-1, ..., 10-4]x
[10-1, ..., 10-4]y
[10-1, ..., 10-4]z
70
18x
18y
18z
12x
12y
12z

1xN
30a
30f
Ca
Cf
[10]a
[10]b
[10]e
[10]f
80
82
12a
12b
12c
12d
12e
12f

OFFSET LAUNCH MODE FROM NANOTAPER WAVEGUIDE INTO MULTIMODE FIBER

CROSS-REFERENCE TO RELATED APPLICATIONS

This application claims the benefit of U.S. Provisional Application No. 60/962,097, filed Jul. 26, 2007, and U.S. Provisional Application No. 61/127,806, filed May 15, 2008.

TECHNICAL FIELD

The present invention relates to the use of a nanotaper optical waveguide to provide coupling into a multimode fiber and, more particularly, to controlling the offset between the nanotaper termination and the optical axis of the multimode fiber to improve the launch conditions into the fiber.

BACKGROUND OF THE INVENTION

Fiber optic technology is playing an ever-increasing role in the modern age of communications. As communication standards such as Fibre Channel (1062 Mbps) and Gigabit Ethernet (1000 Mbps) place ever-increasing demands on the physical layer infrastructure, optical fiber is being looked to more and more as the transmission medium of choice. Advancements in optoelectronic devices have furthered the desirability of fiber-based arrangements, since these arrangements not only support the necessary high data transmission rates, but the cost is becoming more and more affordable.

A key aspect of the affordability is the modularity by which the advancements in optical fiber technology are being implemented, particularly with regard to their backward compatibility with existing network components, such as multimode fiber. Advancements that cannot be delivered to the marketplace with backward compatibility may not be as desirable as competing advancements which are backward compatible. For example, if an advancement requires recabling an entire building from multimode to single mode fiber, then it may not be a viable solution. If an advancement requires specialized equipment, connectors, patch cords and the like, then it too may not be a viable solution. Accordingly, a desirable feature of any new technological advancement is the modularity and/or compatibility with existing components.

One "legacy" aspect of fiber-based communication systems is their utilization of multimode fiber; that is, a fiber with a relatively large core area that is able to support a plurality of different spatial modes of a propagating optical signal. More recent systems have utilized smaller core, "single mode" fiber, such that when excited by a laser source, only a single spatial mode is supported. In one class of fiber optic communication systems—wavelength division multiplexed (WDM) systems—it is possible to use either multimode or single mode fiber. In particular, multimode fiber can be used with "coarse" WDM (CWDM) which utilizes wavelength spacing of approximately 20 nm. A multiplexer is still required in this system to combine the separate wavelengths into the single transmission fiber.

The extensive earlier deployment of multimode fiber has resulted in the need to, at times, provide coupling between multimode fiber and single mode fiber. Since each spatial mode in the multimode fiber has slightly different propagation characteristics, the coupling of a single mode signal into multimode fiber will inevitably result in spreading the propagating pulses in time (modal dispersion), limiting the useful bandwidth-distance product of the system. Arrangements for improving the bandwidth are considered to be desirable.

In some cases, electronic dispersion compensation (EDC) techniques have been used to correct for the presence of modal dispersion in a received signal. Generally speaking, EDC utilizes arrangements such as active filters to create a set of delayed samples of a received signal (once an optical-to-electronic conversion has been performed). The samples are thereafter scaled and reconstructed to form the original signal. Filtering such as Finite Impulse Response (FIR) or Feed Forward Equalization (FFE) have been found useful for this application. However, the need to include additional electronic components in an optical receiver is not an acceptable solution in some cases, particularly where the physical size and power requirements of the receiver are limited.

It has previously been shown that the bandwidth of a multimode optical fiber can be increased by launching optical signals from a single-mode optical fiber into the multimode optical fiber with a deliberate, predetermined offset between the central axis of the single-mode optical fiber and the central axis of the multimode optical fiber. This feature, referred to as an off-axis or offset launch condition, represents a significant advancement because it has the potential to extend the bandwidth of existing multimode optical fiber installations, such as in a local area network (LAN). By increasing the available bandwidth, the useful life of existing or new installations of multimode fiber may be lengthened. Without the ability to extend the bandwidth, different spatial modes supported by the legacy multimode fiber propagate with different modal group velocities, leading to temporal spreading of a propagating optical signal and thus limiting the speed at which data may be transmitted along this legacy type of fiber.

However, because the dimensions of the offset for an offset launch condition are so small (typically less than 30 μm), the launching single-mode fiber and the receiving multimode optical fiber need to be precisely aligned, preferably within a tolerance on the order of 4-8 μms. Two suggested methods for achieving this precise offset include: the use of a specialized patch cord that incorporates a desired level of offset, or the use of an adapter that precisely aligns the optical fibers so that their cores have a predetermined offset, as described in U.S. Pat. Nos. 6,273,619 and 6,402,390.

While these techniques have some merit, they generally require one or more specialized components or equipment for effectuating an offset launch condition at the fiber interface. Thus, there continues to exist an unsatisfied need in the industry for an optoelectronic module that can be coupled to a multimode optical fiber under an offset launch condition without utilizing specialized equipment or components.

SUMMARY OF THE INVENTION

The needs remaining in the prior art are addressed by the present invention, which relates to the use of a nanotaper optical waveguide to provide coupling into a multimode fiber and, more particularly, to control the offset between the nanotaper termination and the optical axis of the multimode fiber to improve the launch conditions into the fiber.

In accordance with the present invention, the ability to form and precisely align one or more nanotaper coupling waveguides with the core region of a multimode fiber allows for various degrees of offset to be created between the core and the nanotapers. Indeed, it is possible to utilize a plurality of spaced-apart nanotapers (one-dimensional or two-dimensional arrays) with a single multimode fiber and control the launch conditions of one or more optical signals.

It is an aspect of the present invention that the use of nanotaper coupling allows for multiple wavelengths to be simultaneously launched into a multimode fiber (each at a different offset location), providing a wavelength division multiplexing arrangement without the need for a separate multiplexing element. In particular, the arrangement of the present invention is best suited for a coarse wavelength division multiplexing (CWDM) arrangement, where the adjacent wavelengths are spaced by about 20 nm.

In another embodiment of the present invention, an optical switching component may be coupled between an array of nanotaper coupling waveguides and an incoming optical signal, where the switch is controlled to direct the incoming signal into the nanotaper waveguide that provides the least amount of modal dispersion in the multimode fiber. Inasmuch as this condition may change as a function of environmental changes or changes in the wavelength or bit rate of the incoming signal, the switch may be re-activated so as to provide dynamic adjustments in the selection of the "best" nanotaper coupling waveguide, as a function of the various degrees of offset from the center of the multimode fiber core region. Alternatively, the switch may be controlled to simultaneously illuminate more than one nanotaper with an incoming signal, allowing for multiple modes to be excited and decrease the modal dispersion, thus improving the available bandwidth in the multimode fiber.

It is an advantage of the nanotaper coupling arrangement of the present invention that the need for prior art EDC arrangements are significantly reduced, if not eliminated.

It is an aspect of the present invention that the utilization of one or more nanotaper coupling waveguides formed within a silicon-on-insulator (SOI) optical substrate platform allows for straightforward and reproducible offset launch conditions to be achieved between single mode optical signals propagating along the nanotaper(s) and the core region of a multimode fiber (which may be disposed along a V-groove, rectangular trench, or other suitable "alignment fixture" formed in the substrate platform). Such an integrated approach to coupling single mode signals into legacy multimode fiber is considered to be an improvement over the prior art which required the use of a patch cord (or similar interface element) between a single mode fiber and multimode fiber and strictly limited the number of propagating signals and applications for the legacy multimode fiber.

The nanotaper coupling waveguide arrangement of the present invention may also be utilized with an array of multimode fibers, where one or more offset nanotaper coupling waveguides are used to couple separate signals into each one of the multimode fibers in the array. Various switching fabrics may be used to select the specific nanotaper coupling waveguide to use for each fiber and, in one embodiment, may be used to direct an incoming optical signal into any one of the fibers within the array.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

For reasons well known in the art, the various modes propagating in a length of multimode fiber travel along the fiber at different velocities. The different velocities of these modes give rise to the phenomenon of modal dispersion. Several techniques have been developed and deployed to control the modes that are excited and launched in multimode optical fiber. One technique, known as radial offset launch, has been demonstrated to selectively launch "more favorable" modes (that is, the intermediate modes beyond the lowest-order modes associated with propagation along the center of the fiber). As mentioned above, prior art arrangements for providing offset launch conditions generally rely on the use of a connector or "patch cord" to ensure that an incoming single mode signal is directed to an off-center location along the multimode fiber core.

Figure 1:
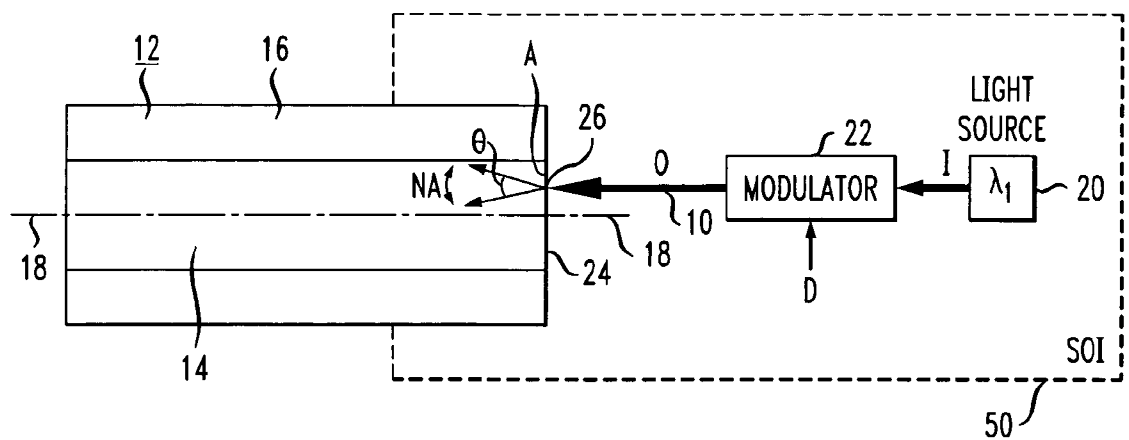
FIG. 1 contains a simplified diagram of the arrangement of the present invention utilizing an off-set nanotaper coupling waveguide in conjunction with a multimode fiber.

FIG. 1 illustrates, in a simplified diagram form, an arrangement of the present invention which utilizes a nanotaper waveguide 10 to provide offset coupling into a multimode fiber 12, eliminating the need for the various coupling components of the prior art. A "nanotaper" or "inverse nanotaper", is generally defined as a terminating portion of a core of a high-contrast index waveguide used to facilitate efficient coupling between an optical fiber (or other, generally "free-space" optical waveguiding structure—in this case, a multimode waveguiding structure) and an integrated optical waveguide disposed on a substrate with the nanotaper. The lateral dimension of the nanotaper decreases monotonically from its interface with the integrated optical waveguide to the endface of the free-space waveguiding structure, where it reaches a small value associated with the "tip" of the nanotaper.

Referring again to FIG. 1, multimode fiber 12 comprises a relatively large diameter core region 14, surrounded by a cladding layer 16. Multimode fiber 12 may comprise a graded-index multimode fiber, step-index multimode fiber, or any other type of multimode fiber which is deployed in communication systems. In accordance with the present invention, nanotaper waveguide 10 is positioned offset from the central optical axis 18 of multimode fiber 12, as shown in FIG. 1, so as to excite preferential modes within the fiber that will limit the amount of modal dispersion that is created. By adjusting the offset between the nanotaper tip and central axis 18, the differential mode delay may be adjusted as function of various factors including, but not limited to, the type of multimode fiber deployed in the system.

In one embodiment, nanotaper waveguide 10 is formed within a silicon surface layer of an SOI-based optical structure 50, as will be discussed in detail below, with fiber 12 being disposed in relation thereto so as to form the offset configuration. In general, nanotaper waveguide 10 may comprise any material capable of supporting the transmission of an optical signal, such as a nitride-based material (silicon nitride ($Si_3N_4$), silicon oxynitride (SiON)) or any other suitable high refractive index material. Indeed, when using silicon nitride, the light launch condition has been found to be less sensitive to wavelength than a pure silicon waveguide.

In the arrangement as shown in FIG. 1, a continuous wave (CW) optical input signal I at a predetermined wavelength $\lambda_1$ is provided by a light source 20 and is coupled into an electro-optic modulator 22. An electrical data signal D is applied as the modulating (data) input to modulator 22. The modulated optical output signal O is thereafter coupled into nanotaper waveguide 10 and impinges endface 24 of multimode fiber 12 at a predetermined location A along core region 14, which is offset a predetermined amount from optical axis 18. By virtue of offsetting tip 26 of nanotaper 10 from optical axis 18, the lowest-order mode of the fiber will not be excited. Instead, multiple "intermediate" modes of the multimode fiber will be excited and thus more evenly distribute the signal into different spatial modes of the fiber. As a result of this signal distribution, the differential mode delay will be significantly decreased and the modulated signal will be able to propagate down a relatively long span of multimode fiber without requiring the use of a "patch cord" or other modal compensation techniques, as described above.

Figure 2:
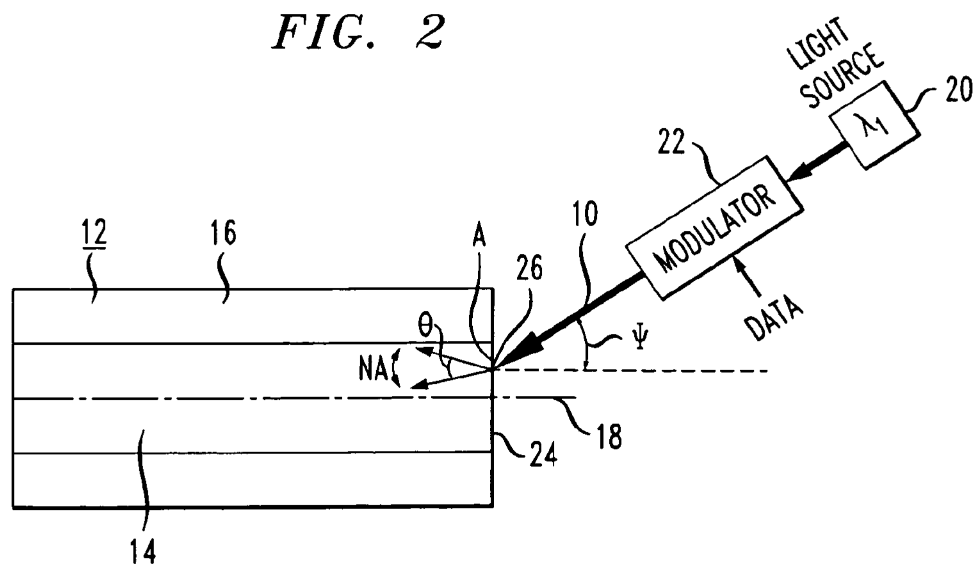
FIG. 2 illustrates an alternative embodiment of the arrangement of FIG. 2, with the nanotaper waveguiding disposed at an angle with respect to the endface of the multimode fiber.

FIG. 2 illustrates another arrangement of the embodiment of FIG. 1. In this particular configuration, nanotaper 10 is disposed at an angle $\psi$ with respect to endface 24 of multimode fiber 12. The angular displacement will, depending on the refractive index values of the multimode fiber, dimensions of the nanotaper and the propagating wavelength, distribute the incoming single mode signal into even more intermediate modes and further reduce the presence of differential mode delay.

Figure 3:
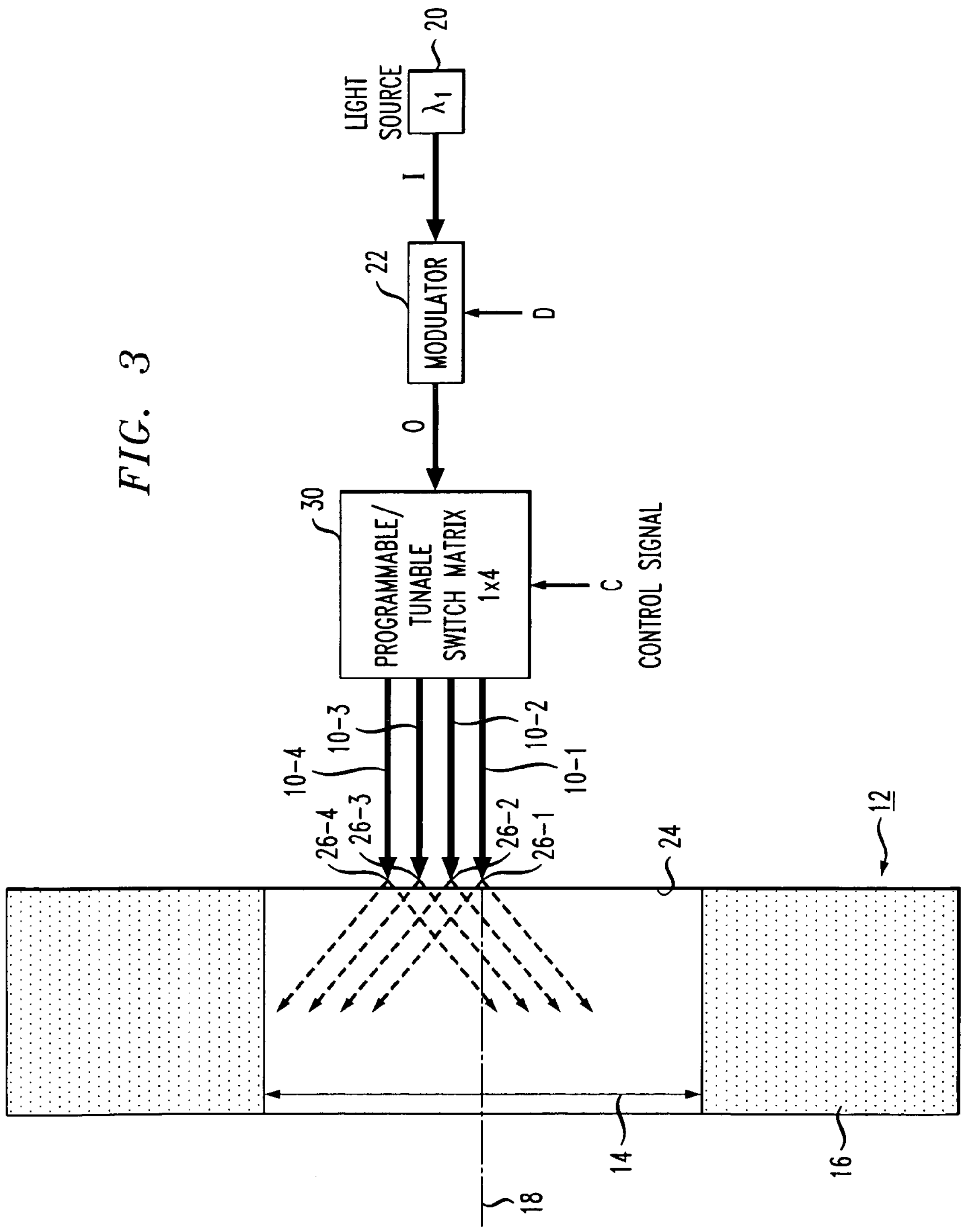
FIG. 3 illustrates an embodiment of the present invention utilizing a plurality of nanotaper coupling waveguides in association with a multimode fiber.

It is also possible to utilize a plurality of separate nanotapers to provide coupling into a multimode fiber, where one such embodiment is shown in FIG. 3. In this particular example, a set of four separate nanotaper waveguides 10-1, 10-2, 10-3 and 10-4 are disposed as a linear array across a portion of core region 14 of multimode fiber 12. While only four such waveguides are shown, any desired number of nanotaper coupling waveguides may be used and disposed in any configuration with core region 14, limited only by the diameter of the multimode core and the dimensions of the nanotaper tips. In the exemplary arrangement of FIG. 3, first nanotaper waveguide 10-1 is aligned with optical axis 18, with the remaining nanotapers disposed outward therefrom toward cladding layer 16. While this particular arrangement illustrates the placement of nanotaper waveguides 10 on only one side of optical axis 18, it is to be understood that the nanotaper coupling waveguides of the present invention may be disposed in any suitable arrangement which is capable of coupling optical signals into core region 14 of multimode fiber 12.

For a specific, pre-installed multimode fiber, optimum signal integrity can be obtained by selecting a specific nanotaper 10-i from the plurality of nanotaper waveguides 10-1, 10-2, 10-3 and 10-4 which provides minimal differential mode dispersion, since each nanotaper exhibits a different offset with respect to optical axis 18. Alternatively, two or more of the nanotapers may be used at the same time to illuminate the fiber. Indeed, and as will discussed in detail hereinbelow, the use of multiple nanotapers allows for the creation of a WDM system with signals propagating at different wavelengths.

In the specific embodiment of FIG. 3, a switch matrix 30 is included and positioned between nanotaper array 10 and modulator 22. In this case, a separate external control signal C is applied as an input to switch matrix 30 and used to control the coupling of the output O from modulator 22 into a selected one (or more) of the plurality of nanotaper waveguides 10-1 through 10-4. Indeed, the use of an external control signal can provide dynamic "tuning"/adjustment of the performance of the multimode fiber (in terms of, for example, limited differential mode dispersion and/or lowest bit error rate) by switching from one nanotaper coupling waveguide to another as conditions change (for example, physical changes (such as changes in data rate, wavelength, variations in dimensions from one multimode fiber to another and the like), environmental changes (temperature, etc.) or any other changes that may affect the modal dispersion within the multimode fiber).

As mentioned above, a significant aspect of the nanotaper offset illumination arrangement of the present invention is the ability to form the nanotaper coupling waveguide—or plurality of waveguides—in an optical substrate with other opto-electronic components (such as, but not limited to, the modulator and switch components described above). By virtue of forming the nanotapers in an optical substrate, a fiber support and alignment fixture may be formed within the substrate material so as to provide for the desired offset launch conditions between the nanotaper waveguides and the multimode fiber. In one embodiment, a V-groove support and alignment fixture may be used for the associated multimode fiber and located so as to be "offset" from the nanotaper waveguide(s). Alternatively, a rectangular 'trench' may be used, where well-known CMOS etching techniques can be used to form either the V-groove or trench geometries. Other types of support and alignment fixturing may be used and are considered to fall within the scope of the present invention.

Figure 4:
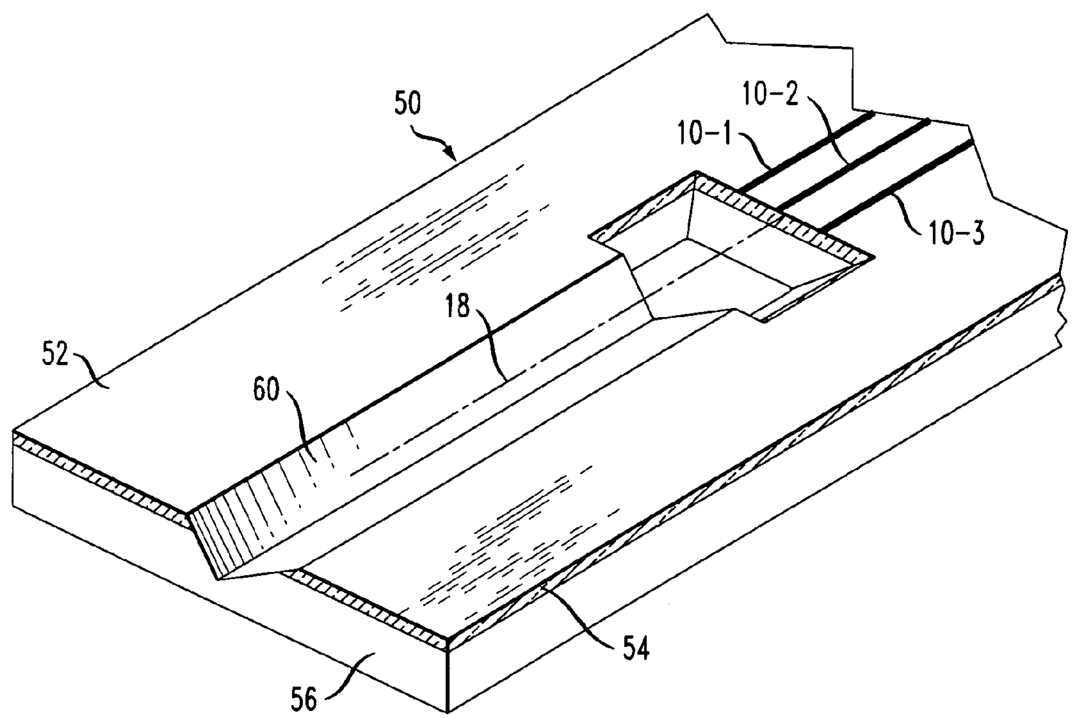
FIG. 4 is an isometric view of a portion of an SOI structure including a plurality of nanotaper coupling waveguides and a V-groove support for an associated multimode fiber.

FIG. 4 illustrates this aspect of the present invention, where an exemplary SOI structure 50 is formed to include a plurality of nanotaper coupling waveguides 10. In this particular embodiment, a set of three nanotaper coupling waveguides 10-1, 10-2 and 10-3 are shown and are disposed so as to be offset from optical axis 18. SOI structure 50 is shown as comprising a single crystal silicon surface layer 52, an underlying buried oxide (BOX) layer 54 and a silicon substrate 56. Nanotaper coupling waveguides 10 are formed, as shown, within silicon surface layer 52. In this particular arrangement, a V-groove 60 is etched into SOI structure 50, using standard CMOS processing techniques, to form an alignment fixture for supporting a multimode fiber in an offset launch configuration with respect to nanotaper coupling waveguides 10. Advantageously, the use of well-known CMOS processing allows for V-groove 60 to be precisely and accurately disposed with respect to nanotapers 10 so as to form the desired off-set between tapers 10 and the center of a multimode fiber supported in V-groove 60.

Figure 5:
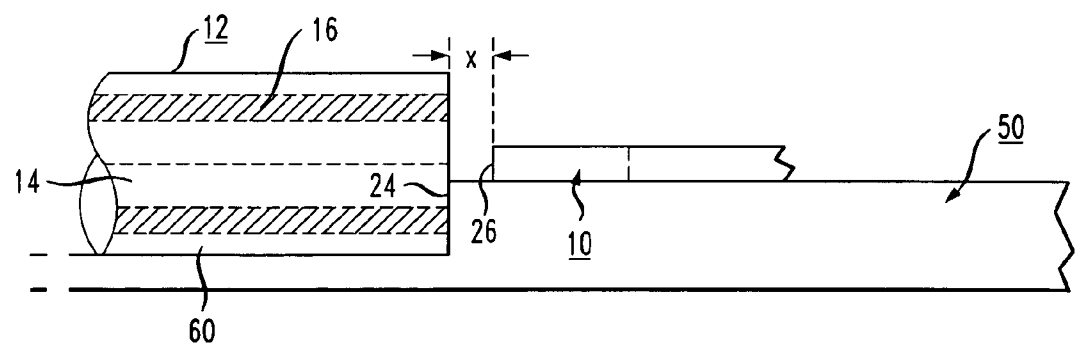
FIG. 5 is a side view of FIG. 4, illustrating a particular embodiment where a nanotaper tip is axially set back from the endface of an associated multimode fiber.

It has been found that increased coupling efficiency between a nanotaper waveguide and free-space optical signal can be achieved by recessing tip 26 of nanotaper waveguide 10 by a few microns from the plane of multimode fiber endface 24. FIG. 5 is a side view of a portion the arrangement of FIG. 4, illustrating the set-back of an exemplary nanotaper tip 26 with respect to multimode fiber endface 24. As shown, nanotaper tip 26 is axially set back a predetermined distance x from endface 24 of multimode fiber 12. Indeed, it is possible to adjust the placement of each separate nanotaper tip when multiple nanotaper coupling waveguides are used, creating (possibly) a different set-back condition for each nanotaper within the array of nanotaper waveguides.

Figure 6:
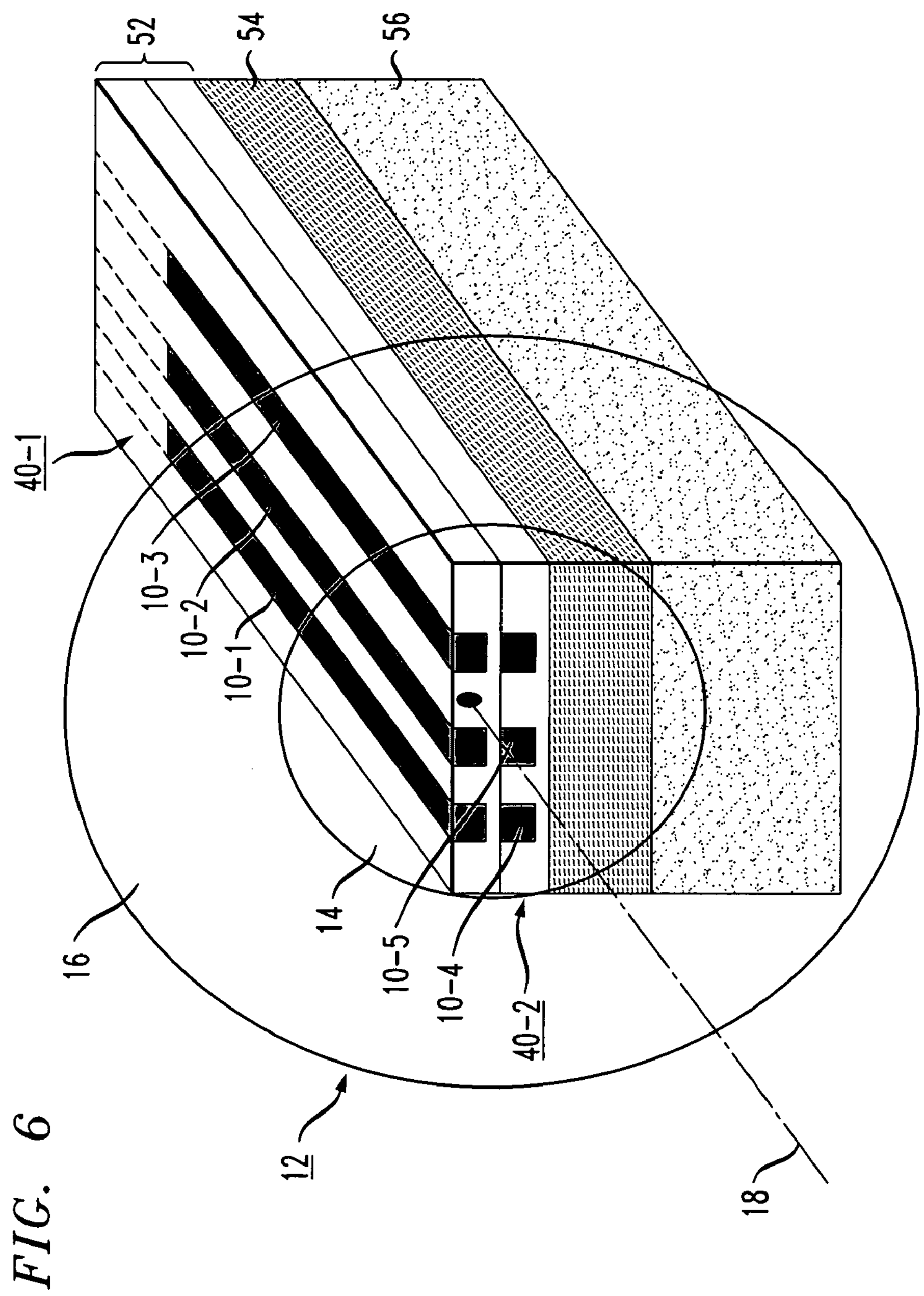
FIG. 6 is an enlarged view of the coupling portion of the arrangement of FIG. 4, in this case including a stacked arrangement of nanotaper arrays.

While the array of nanotaper waveguides 10 is disposed in a linear arrangement in the arrangement of FIG. 4, it is to be understood that one array of nanotapers may be 'stacked' on top of another, as shown in FIG. 6. In this particular embodiment, a first nanotaper coupling waveguide array 40-1 (which includes nanotapers 10-1, 10-2 and 10-3) is disposed over a second nanotaper coupling array 40-2 (which includes nanotaper 10-4, 10-5 and 10-6). Since the multimode material exists across the entire extent of the core region, the arrays may disposed in two dimensions, as shown, so as to provide two-dimensional control of the offset from optical axis 18 and/or provide multiple input signals at different wavelengths (as discussed below). Moreover, in light of the discussion associated with FIG. 5, various ones of the nanotaper waveguides within each array may be set back with respect to the fiber endface.

As mentioned above, one embodiment of the present invention is to provide multiplexing of a plurality of signals operating at a plurality of different wavelengths into a single multimode fiber. The use of one- and two-dimensional nanotaper waveguide arrays is well-suited to this aspect of the present invention.

Figures 7, 8:
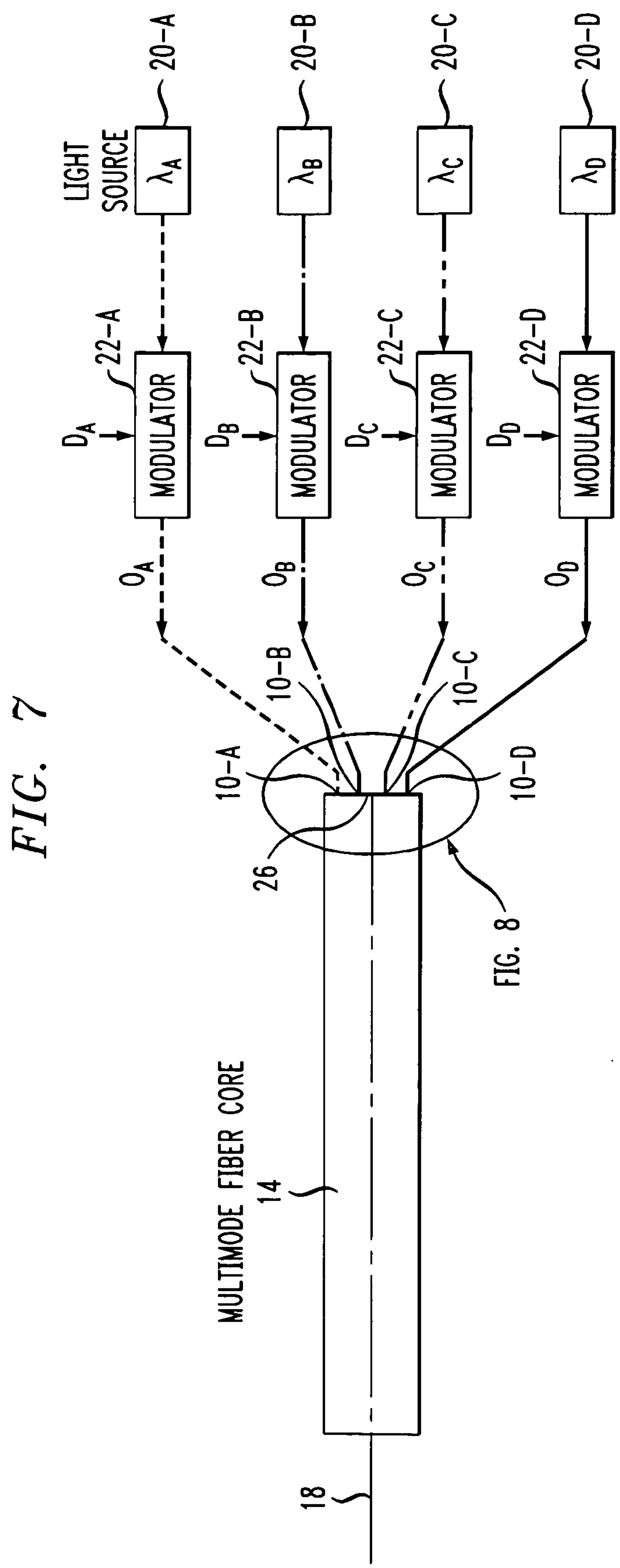
FIG. 7 illustrates a WDM embodiment of the present invention.
FIG. 8 is an enlargement of the nanotaper launch region of the arrangement of FIG. 7.
Figure 8:
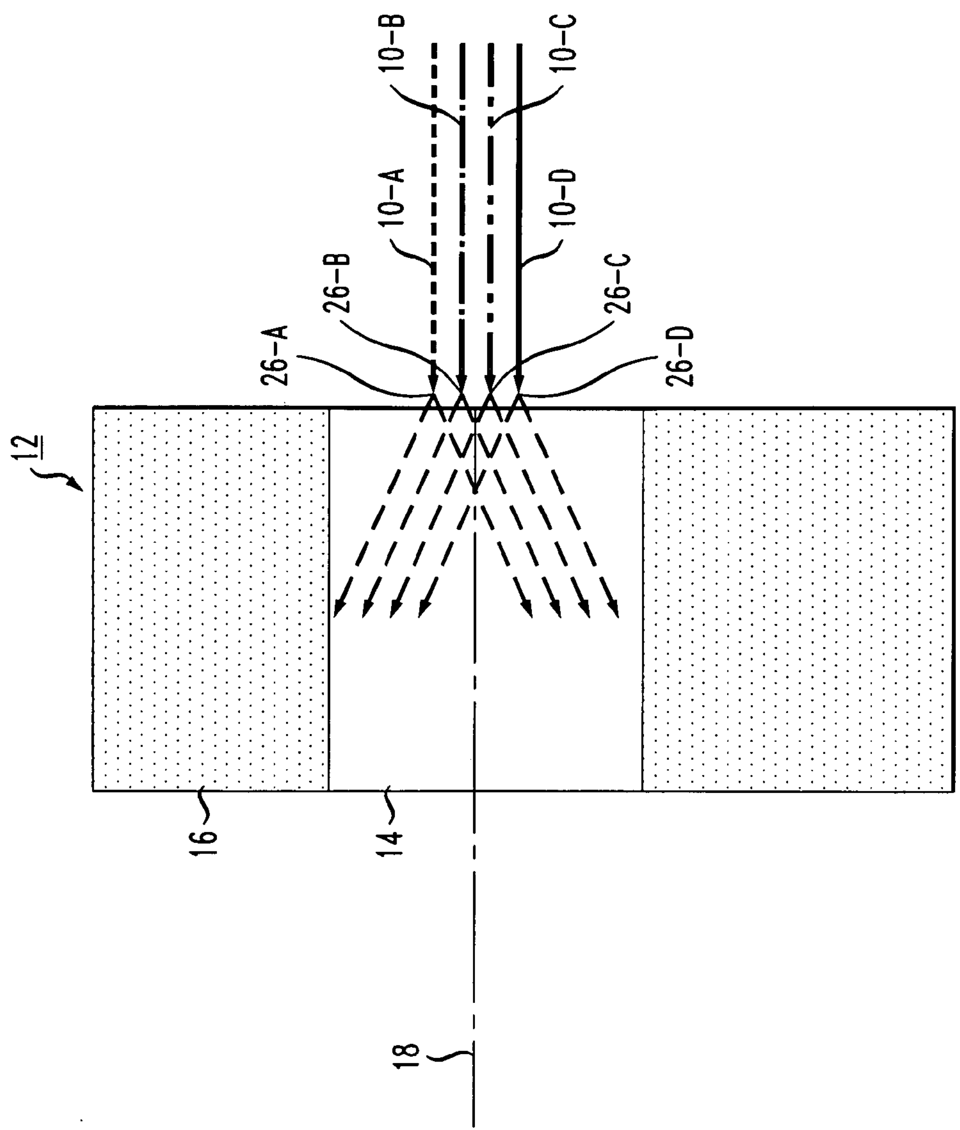

FIG. 7 illustrates, in a simplified form, a multiplexing arrangement of the present invention which may be used to simultaneously launch four separate modulated signals (operating at four different wavelengths, as shown) into core region 14 of multimode fiber 12. As mentioned above, it is possible to use multimode fiber to support the simultaneous propagation of a plurality of separate wavelengths within multimode fiber, particularly in the case of CWDM where the adjacent wavelengths are separated by about 20 nm. In this particular example, a set of four separate optical sources 20-A, 20-B, 20-C and 20-D are used to generate a set of four CW optical signals at wavelengths λ-A, λ-B, λ-C and λ-D, respectively. These optical signals are thereafter applied as inputs to a set of four separate electro-optic modulators 22-A, 22-B, 22-C and 22-D (the set of "four" considered as being exemplary only; various other pluralities of optical sources and modulators may be used in the arrangement of the present invention).

A different incoming data signal is applied as an input to each modulator ($D_A$, $D_B$, $D_C$ and $D_D$) to create a set of four modulated optical output signals ($O_A$, $O_B$, $O_C$ and $O_D$). As shown in FIG. 7, these signals are thereafter coupling into their respective nanotaper coupling waveguides 10-A, 10-B, 10-C and 10-D. As shown in FIG. 7, each separate nanotaper coupling waveguide 10 is coupled into core region 14 of the multimode fiber. Advantageously, therefore, the nanotaper coupling arrangement of the present invention is able to provide multiple input signals to the optical fiber without the need for an intermediate multiplexing component (as is required in prior art WDM arrangements).

FIG. 8 is an enlargement of the nanotaper launch region of the arrangement of FIG. 7, illustrating in particular the offset displacement of the plurality of nanotaper waveguides 10 with respect to optical axis 18 of multimode fiber core region 14. The position of nanotaper tips 26-A, 26-B, 26-C and 26-D is particularly shown in this view.

There are various options in terms of positioning the plurality of nanotaper coupling waveguides 10 with respect to core region 14 of multimode fiber 12. In one case, the plurality of nanotapers are spaced to ensure that each wavelength excites a different set of spatial modes within the multimode fiber (i.e., maximizes separation between adjacent nanotaper coupling waveguides). Alternatively, the spacing between adjacent nanotaper coupling waveguides can be minimized, ensuring that each wavelength excites a similar set of spatial modes. In any case, the coupling properties to the multimode fiber can be optimized by ensuring that the numerical aperture (NA) of each nanotaper tip is matched to the NA of the multimode fiber.

Figure 9:
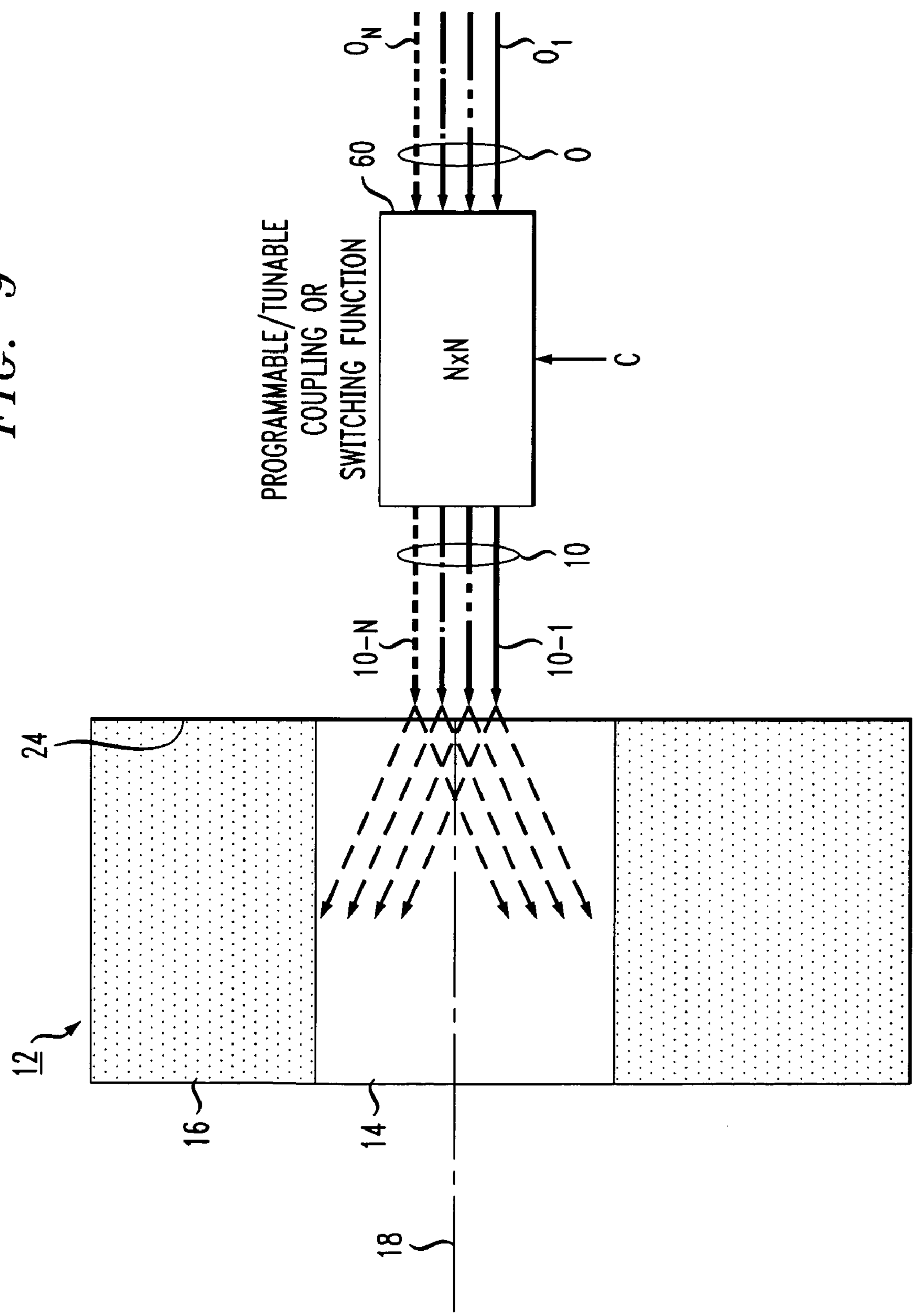
FIG. 9 is an alternative arrangement of the embodiment of FIG. 7, including a switching component to control the association between the various input signals and the various nanotaper coupling waveguides.

Similar to the arrangement shown in FIG. 3, the multiple wavelength arrangement of FIG. 7 may also utilize a controllable switch element to select the proper output nanotaper to connect with an incoming multiplexed signal at a selected wavelength. FIG. 9 illustrates this embodiment, where an N×N optical switch 60 is included in the system and disposed between a plurality of N nanotaper coupling waveguides 10 and a plurality of N modulated output data signals O. Switching element 60 may be programmable and/or tunable to adjust the spatial location of the nanotaper coupling waveguide to be excited by a selected output data signal. Switching element 60 may also be used to provide an add/drop function in terms of controlling which signals are sent to separate ones of the nanotaper coupling waveguides. Alternatively, a single input signal may be sent to a multiple number of separate nanotaper coupling waveguides so as to control the launch conditions of an input signal into core region 14 of multimode fiber 12.

Switching element 60 may be formed as a monolithic component on the same substrate as the optical waveguides and the nanotaper coupling waveguides. On the other hand, switching element 60 may take the form of a discrete component that is mounted on, and used with, the substrate containing the plurality of nanotaper coupling waveguides 10.

Figure 10:
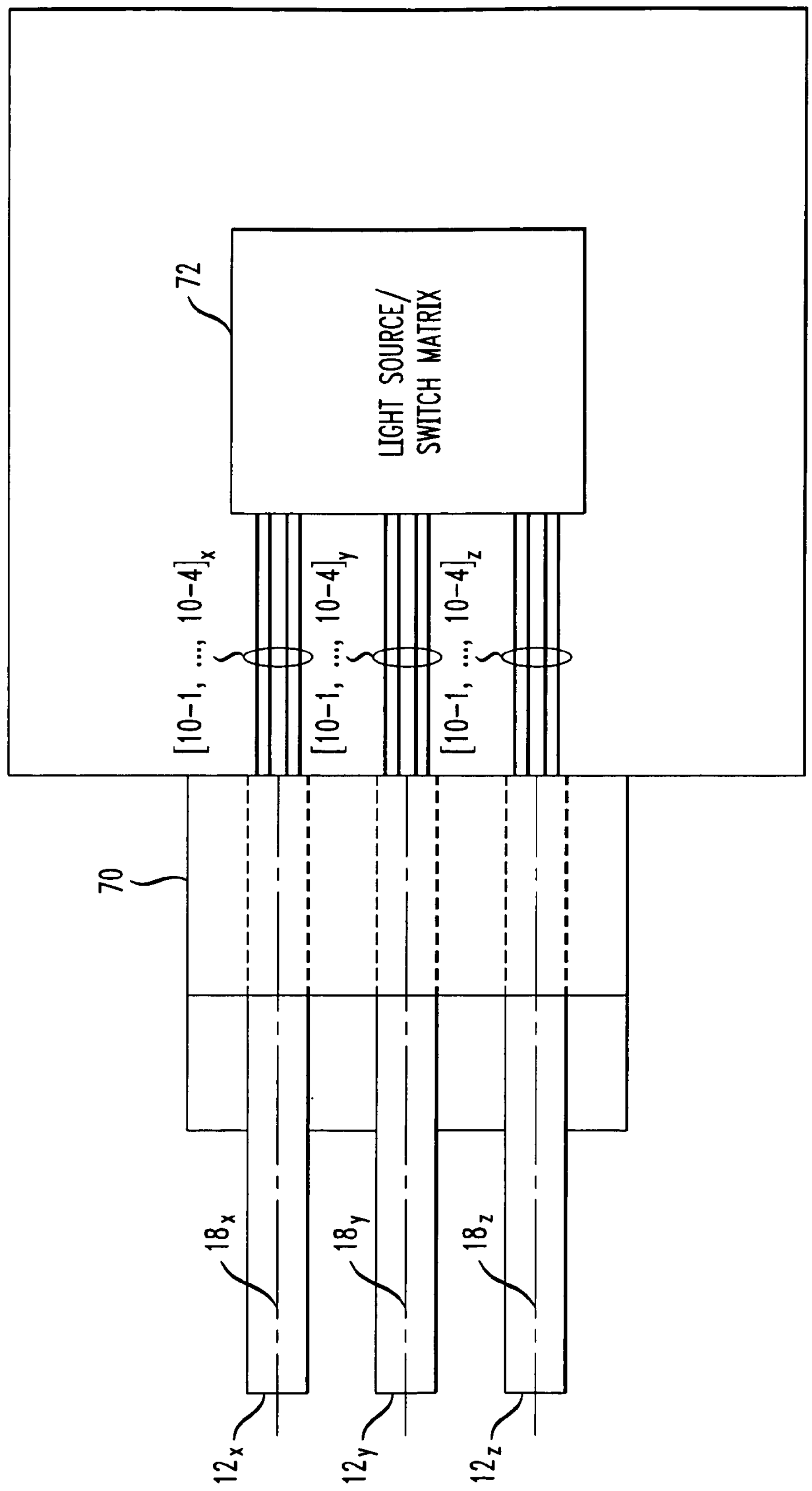
FIG. 10 is an isometric view of one exemplary arrangement for coupling a multimode fiber array to a plurality of nanotaper coupling waveguides.

In a further expansion of the concepts of the present invention, the offset nanotaper launch arrangement may also be used with an array of multimode fibers. FIG. 10 is a top view of an exemplary, simplified fiber array embodiment of the present invention. In this particular example, a set of three separate multimode fibers $\mathbf{12}_x$, $\mathbf{12}_y$ and $\mathbf{12}_z$ are coupled in an offset launch mode configuration with an associated plurality of nanotaper coupling waveguides $[\mathbf{10}]_x$, $[\mathbf{10}]_y$ and $[\mathbf{10}]_z$, where each plurality of nanotapers [10] may comprise any desired number of individual nanotaper coupling waveguides. In this particular embodiment, each plurality of nanotapers [10] is shown as comprising a set of four individual fibers 10-1, 10-2, 10-3 and 10-4. It is to be understood that an "array" of multimode fibers may comprise any desired number of fibers, where commercially available fiber "ribbons" generally comprise eight, ten or twelve separate fibers.

Referring to FIG. 10, the arrangement is shown as including a fiber support and alignment fixture 70 which is disposed with respect to the entire grouping of nanotaper coupling waveguides $[\mathbf{10}]_x$, $[\mathbf{10}]_y$ and $[\mathbf{10}]_z$ such that the optical axis of each multimode fiber (shown as optical axes $\mathbf{18}_x$, $\mathbf{18}_y$ and $\mathbf{18}_z$, respectively) is offset from the tips of each associated plurality of nanotapers 10. A light source/switching matrix 72 is also shown in FIG. 10, where light source/switching matrix 72 is used to control the application of the various optical signals to the separate multimode fibers $\mathbf{12}_x$, $\mathbf{12}_y$ and $\mathbf{12}_z$, as well as which one(s) of the offset nanotapers are used to illuminate the various fibers. The input signals may be in the form of a separate wavelength for each fiber or, alternatively, a set of wavelengths for each fiber—providing for WDM transmission along each fiber. Indeed, as described below, it is possible to control the operation of matrix 72 to switch the coupling of a specific optical signal from one multimode fiber to another, as desired.

Figure 11:
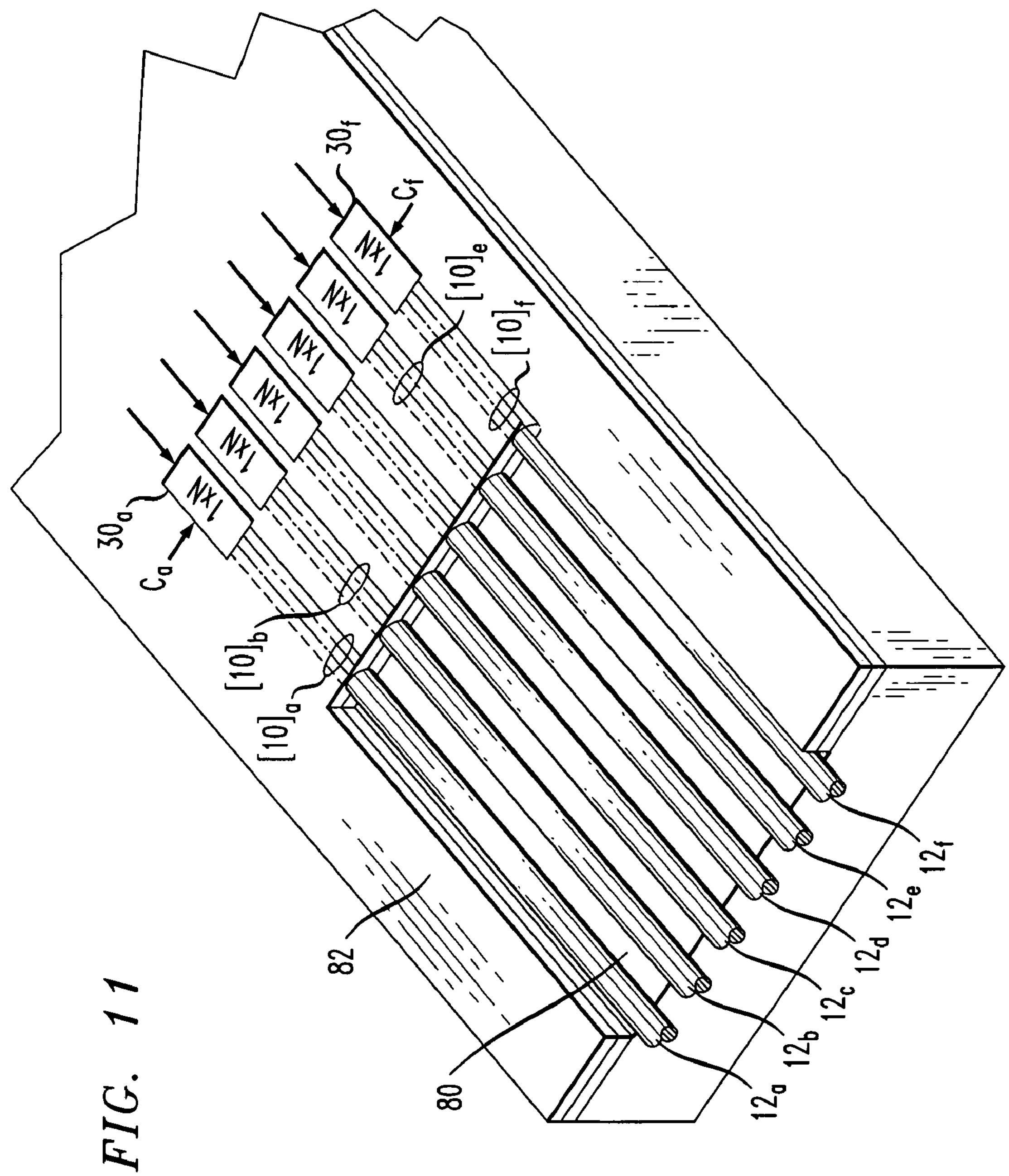
FIG. 11 is an isometric view of an embodiment of the arrangement of FIG. 10, utilizing a separate switching element for each multimode fiber in the fiber array.

One particular fiber array embodiment of the present invention is illustrated in FIG. 11. In this particular embodiment, a rectangular trench 80 is formed in an optical substrate 82 as the alignment fixture which provides for offset launch conditions between a plurality of multimode fibers $\mathbf{12}_a$, $\mathbf{12}_b$, . . . , $\mathbf{12}_f$ and an associated plurality of nanotaper coupling waveguides $[\mathbf{10}]_a$, $[\mathbf{10}]_b$, . . . , $[\mathbf{10}]_f$ (where each reference [10] includes one or more separate nanotaper coupling waveguides). It is an advantage of the arrangement of the present invention that conventional "deep" reactive ion etching may be used to form trench 80 in a silicon substrate 82 so as to be precisely aligned (in the desired offset configuration) with nanotaper coupling waveguides [10] formed within the same silicon substrate material.

In the embodiment of FIG. 11, a separate 1×N switch 30 is used with each separate plurality of N nanotaper coupling waveguides within each nanotaper coupling waveguide set [10]. A separate control signal (only signals $C_a$ and $C_f$ being shown in FIG. 11 for the sake of clarity) is associated with each switch and used to select the coupling nanotaper(s) which provides the least amount of differential mode dispersion (the selection being adjustable, as discussed above, to provide on-going tuning of the modal dispersion as changes in the propagating signal occur). Again, various signals operating at different wavelengths may be simultaneously applied to each fiber to provide a WDM system.

Figure 12:
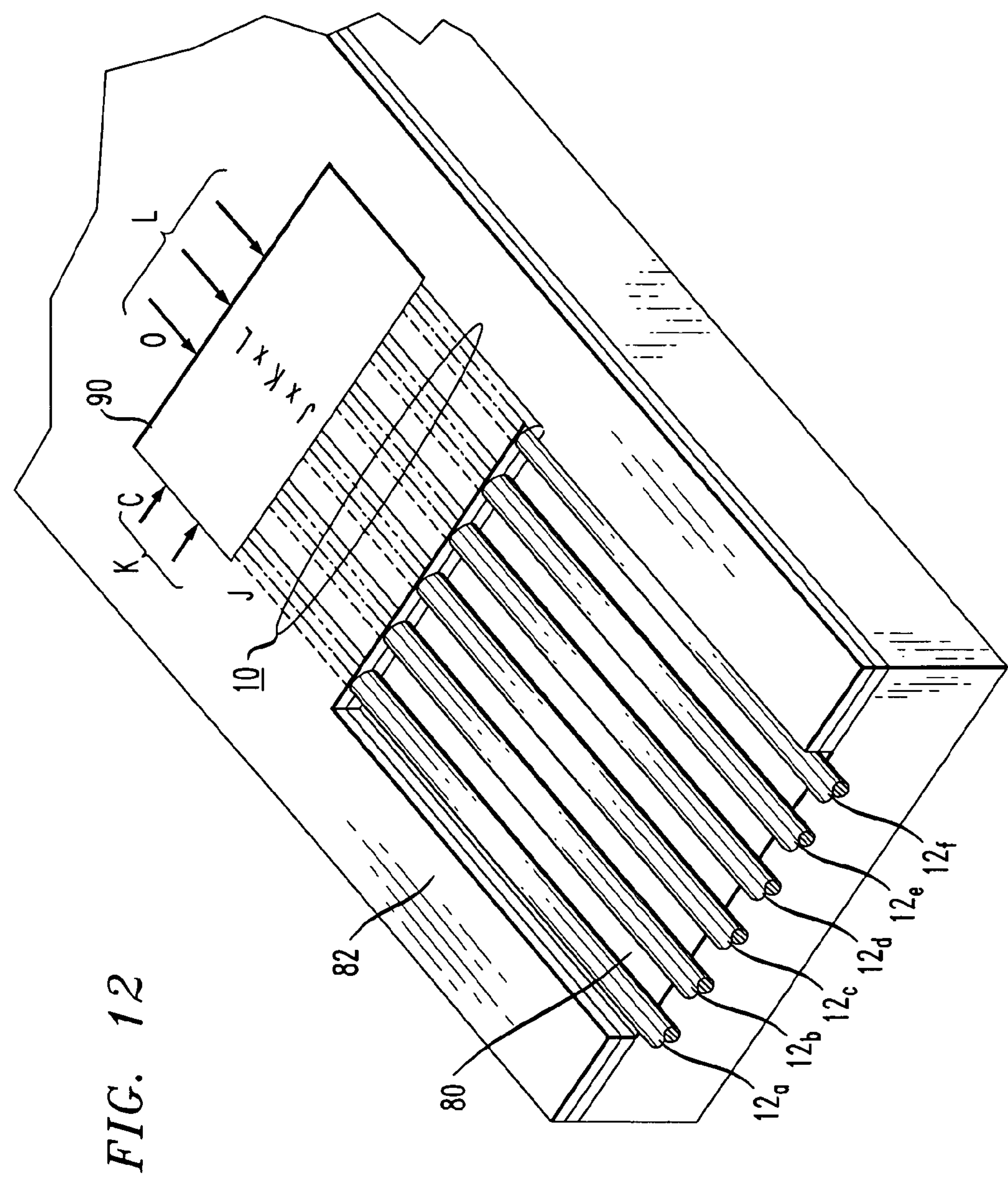
FIG. 12 is an isometric view of an alternative arrangement for providing switching between a plurality of multimode fiber and a plurality of nanotaper coupling waveguides, based upon the arrangement of FIG. 10.

FIG. 12 illustrates an alternative embodiment utilizing an array of multimode fibers. In this case, a single J×K×L switch 90 is used to control the application of a plurality of L modulated optical signals across a plurality of J nanotaper coupling waveguides 10 using a set of K control signals. As discussed above, one incoming signal may be coupled into several nanotapers associated with the same multimode fiber (decreasing differential modal dispersion by exciting several different spatial modes), or different wavelength signals may be applied to a single fiber. Indeed, it is possible with this particular embodiment to switch the application of an incoming optical signal from one multimode fiber to another.

The present invention may be embodied in other specific forms without departing from its spirit or essential characteristics. The described embodiments are to be considered in all respects only as illustrative, and not restrictive. The scope of the present invention is, therefore, indicated by the appended claims rather than by the foregoing description. All changes which come within the meaning and range of equivalency of the claims are to be embraced within their scope.

What is claimed is:

1. An optical substrate-based arrangement for providing offset coupling conditions from a plurality of nanotaper optical waveguides formed on the optical substrate into a separate multimode optical waveguiding structure, the multimode optical waveguiding structure defined as comprising a terminating endface for receiving a plurality of incoming optical signals, the optical substrate-based arrangement comprising a plurality of nanotaper optical waveguides formed as an array within the optical substrate, each nanotaper waveguide including a tapered tip termination; and an alignment fixture formed in the optical substrate at a predetermined location so as to expose the nanotaper waveguide tapered tip terminations and create an offset between the nanotaper optical waveguide tip terminations and the terminating endface of the separate multimode optical waveguiding structure.

2. The arrangement as defined in claim 1 wherein the separate multimode optical waveguiding structure comprises a multimode optical fiber.

3. The arrangement as defined in claim 1 wherein the separate multimode optical waveguiding structure comprises an array of multimode optical fibers.

4. The arrangement as defined in claim 1 wherein the alignment fixture comprises a V-groove formed in the optical substrate for supporting the separate multimode optical waveguiding structure in a predetermined offset launch condition with respect to the tapered tip terminations of the plurality of nanotaper optical waveguides.

5. The arrangement as defined in claim 1 wherein the alignment fixture comprises a rectangular trench formed in the optical substrate for supporting the separate multimode optical waveguiding structure in a predetermined offset launch condition with respect to the tapered tip terminations of the plurality of nanotaper optical waveguides.

6. The arrangement as defined in claim 1 wherein the plurality of nanotaper optical waveguides comprises a one-dimensional array of nanotaper optical waveguides disposed across at least a portion of the separate multimode optical waveguiding structure.

7. The arrangement as defined in claim 6 wherein the plurality of nanotaper optical waveguides comprises a two-dimensional array of nanotaper optical waveguides disposed across at least a sector of the separate multimode optical waveguiding structure.

8. The arrangement as defined in claim 1 wherein the arrangement provides wavelength division multiplexing with each separate nanotaper optical waveguide of the plurality of nanotaper optical waveguides coupling a different optical wavelength signal into the separate multimode optical waveguiding structure.

9. The arrangement as defined in claim 1 wherein the arrangement further comprises an optical switch component disposed in combination with the plurality of nanotaper optical waveguides to select one or more particular nanotaper optical waveguides to present an incoming optical signal into the separate multimode optical waveguiding structure.

10. The arrangement as defined in claim 9 wherein the optical switch is a dynamic switch used to adjust the selected one or more nanotaper optical waveguides as modal dispersion along the separate multimode optical waveguiding structure changes.

11. The arrangement as defined in claim 1 wherein the arrangement further comprises an optical switch component disposed in combination with the plurality of nanotaper optical waveguides to select one or more particular nanotaper optical waveguides to present a plurality of incoming optical signals into the separate multimode optical waveguiding structure.

12. The arrangement as defined in claim 1 wherein the tip terminations of the plurality of nanotaper optical waveguides are spaced across the terminating endface of the separate multimode optical waveguiding structure to ensure that each nanotaper optical waveguide couples into separate spatial modes of the separate multimode optical waveguiding structure.

13. The arrangement as defined in claim 1 wherein the tip terminations of the plurality of nanotaper optical waveguides are disposed adjacent to one another so as to ensure that each nanotaper optical waveguide couples into essentially the same spatial modes of the separate multimode optical waveguiding structure.

14. The arrangement as defined in claim 1 wherein the tip terminations of the plurality of nanotaper optical waveguides is axially set back with respect to the endface termination of the separate multimode optical waveguiding structure.

15. The arrangement as defined in claim 1 wherein the optical substrate-based arrangement comprises a silicon-on-insulator (SOI)-based arrangement.

16. The arrangement as defined in claim 1 wherein the plurality of nanotaper optical waveguides comprises a plurality of silicon waveguides.

17. The arrangement as defined in claim 1 wherein the plurality of nanotaper optical waveguides comprises a plurality of silicon nitride waveguides.

18. The arrangement as defined in claim 1 wherein the plurality of nanotaper optical waveguide comprises a plurality of silicon oxynitride waveguides.

* * * * *